US006185247B1

(12) United States Patent
Williams et al.

(10) Patent No.: US 6,185,247 B1
(45) Date of Patent: Feb. 6, 2001

(54) METHOD OF REDUCING SYNCHRONIZATION REARRANGEMENTS IN SYNCHRONOUS TRANSMISSION SYSTEMS

(75) Inventors: Rodger J. Williams, Kanata; Craig Donald Suitor, Nepean, both of (CA)

(73) Assignee: Nortel Networks Limited, Montreal (CA)

( * ) Notice: Under 35 U.S.C. 154(b), the term of this patent shall be extended for 0 days.

(21) Appl. No.: 09/031,645

(22) Filed: Feb. 27, 1998

(51) Int. Cl.[7] .................................................... H04B 17/02

(52) U.S. Cl. .......................... 375/212; 375/354; 375/356; 370/503; 370/508

(58) Field of Search ....................................... 375/212, 354, 375/356, 358; 370/907, 503, 507, 508, 519

(56) References Cited

U.S. PATENT DOCUMENTS

| 4,696,051 | * | 9/1987 | Breeden ................................. 455/33 |
| 4,982,185 | * | 1/1991 | Holmberg et al. ............... 340/825.21 |
| 5,327,581 | * | 7/1994 | Goldberg ............................ 455/51.2 |
| 5,828,670 | * | 10/1998 | Narasimha et al. .................. 370/516 |
| 5,914,666 | * | 6/1999 | Zingsheim et al. ............. 340/825.07 |
| 6,014,414 | * | 1/2000 | Yamamoto et al. .................. 375/356 |

* cited by examiner

Primary Examiner—Stephen Chin
Assistant Examiner—Dac V. Ha
(74) Attorney, Agent, or Firm—Foley & Lardner

(57) ABSTRACT

The invention substantially reduces the occurrence of unnecessary synchronization rearrangements in nodes within synchronous transmission systems such as SONET networks. In one embodiment of the invention, the method disclosed for reducing synchronization rearrangements within interconnected nodes of a synchronous transmission system includes the steps of: detecting, at a node within the synchronous transmission system, a change in a synchronization status message received at the node; propagating the changed synchronization status message from the node to another node within the synchronous transmission system if the changed synchronization status message corresponds to an active timing reference; waiting a specified amount of time upon detection of the change in the synchronization status message; then determining whether a synchronization rearrangement is necessary at the node; and then performing a synchronization rearrangement at the node if necessary. In another embodiment of the invention, the method disclosed for reducing synchronization rearrangements within interconnected nodes of a ring transmission system, includes the steps of: updating a synchronization status message upon a change in synchronization signal quality at a first node of the ring transmission system; transmitting the updated synchronization status message from the first node to a plurality of other nodes within the ring transmission system; propagating the updated synchronization status message from each of the plurality of other nodes to another node of within the ring transmission system if the updated synchronization status message corresponds to an active timing reference; waiting a specified amount of time upon an arrival of the updated synchronization status message at each of the plurality of other nodes; determining for each of the plurality of other nodes whether a synchronization rearrangement is still necessary; and then performing a synchronization rearrangement if necessary.

17 Claims, 15 Drawing Sheets

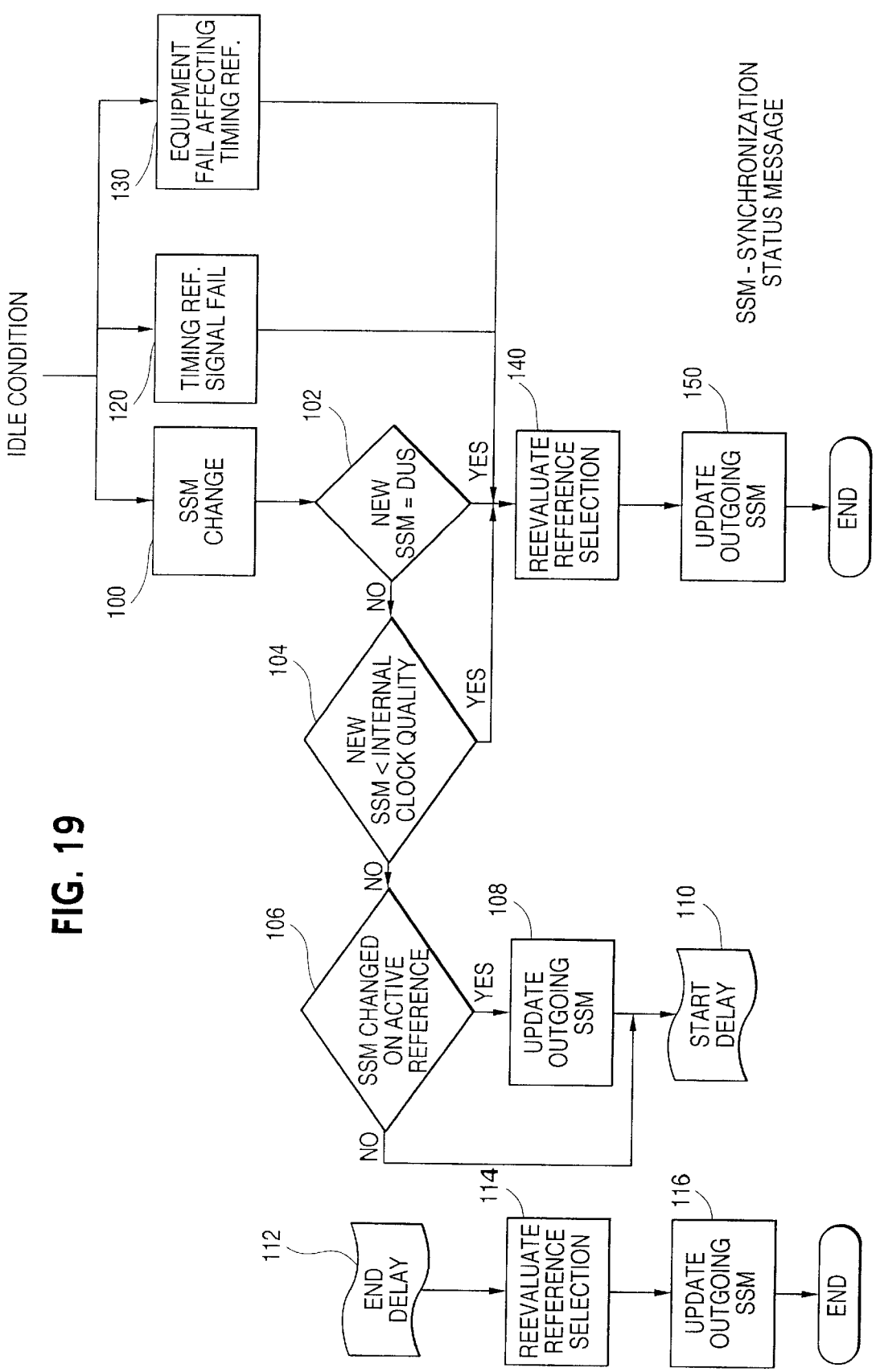

METHOD OF REDUCING SYNCHRONIZATION REARRANGEMENTS IN SYNCHRONOUS TRANSMISSION SYSTEMS

BACKGROUND OF THE INVENTION

The invention relates generally to the operation of nodes within telecommunication networks. Specifically, the invention provides a method of substantially reducing synchronization rearrangements in nodes within synchronous transmission systems such as SONET networks.

SONET (Synchronous Optical Network) has become a popular standard for optical transport of telecommunications traffic. Details of the SONET standard can be found in the BellCore document GR-253-CORE SONET Transport System: Common Criteria. Those skilled in the art are familiar with the use of SONET and its inherent advantages over asynchronous transport technologies. Pertinent to the present invention is the synchronization of SONET networks.

A SONET network is a collection of nodes, or network elements, connected by optical fiber. Nodes within SONET networks can be connected in numerous ways, including in both linear and ring configurations. In a SONET network, each network element must be clocked at the same or nearly the same rate in order to facilitate data transmission at multiples of the basic STS-1 line rate of 51.84 million bits per second (Mbps). The clocking signal utilized at a given network element can be received from a number of sources such as: an internal clock, a signal from another network element in the system, or an externally timed clock such as a building integrated timing supply (BITS). These timing sources are categorized by the level of quality of the timing signal and arranged in a hierarchy where a Stratum 1 (ST1) timing source, such as a Cesium atomic clock, is considered the most stable and accurate while a SONET Minimum Clock (SMC) is the least stable timing source allowed for use in a SONET system under the present standards.

Nodes, or network elements, within SONET systems are configured generally to utilize and synchronize to the best, or highest quality timing source available to it. A common design of a SONET network has one or more nodes externally timed with one or more ST1 and/or ST2 source(s). The other network nodes may be line timed, thus receiving their timing signals from the externally timed nodes over one or more paths. In such a design, each of the line timed nodes must choose the best signal from among the timing signals supplied by the externally timed nodes, either directly or through intervening nodes and its own internal clock and any locally connected external clocks. When a node determines that the best timing signal available to it is better in quality than the signal to which it is currently synchronized, the active reference signal, a synchronization rearrangement occurs.

The inventors have found that under certain circumstances, when there is a change in the timing signal utilized by one node in a network, considerable delays are caused to occur in one or more of the other nodes in the network which can negatively affect the entire flow of traffic. After an extensive investigation, the inventors have determined that under certain conditions, some network elements are susceptible to being placed in states of synchronization switch oscillation through the performance of repeated and unnecessary synchronization rearrangements. This can occur, in a ring configuration, when a line timed node receives conflicting information from the two sides of the ring regarding the quality of the timing source from a first node shortly after a change in the timing signal utilized by the first node. In such a case, the inventors found that the line timed node was receiving an updated synchronization signal quality level message from one side of the ring at a finite amount of time before it was receiving a similar updated message from the other side of the ring. This apparent difference in timing signal quality, although not a real one, sometimes caused a given node to perform one or more unnecessary synchronization rearrangements. Similar yet unnecessary synchronization rearrangements can occur at a line-timed node in a linear configuration as well as a ring configuration. This can occur when a common timing source, connected indirectly to multiple nodes, fails and updated synchronization status messages arrive at an interconnected line-timed node at different times. The cause for the time delay, as determined by the inventors, can be attributed to the propagation delay due to differences in line length and equipment dependent delay in propagating the synchronization signal quality level message over nodes of differing numbers and types.

SUMMARY OF THE INVENTION

Having identified the above described problem and its source, the inventors have developed the following solution, which is embodied in the present invention. The solution involves programming the synchronous transmission system such that individual nodes within the system are forced to wait a predetermined amount of time after receiving a synchronization status message indicating a change in the synchronization signal quality of an active reference. Only after waiting this amount of time does the individual node attempt to perform a synchronization rearrangement. By forcing the node to wait, it increases the likelihood that any changes in other synchronization status messages will have arrived at the node before a determination is made as to whether a synchronization rearrangement is attempted at that node. This reduces the number of unnecessary synchronization rearrangements, thus preventing harmful synchronization rearrangements and effectively solving the identified problem.

In one embodiment of the invention, the method disclosed for reducing synchronization rearrangements within interconnected nodes of a synchronous transmission system includes the steps of: detecting, at a node within the synchronous transmission system, a change in a synchronization status message received at the node; propagating the changed synchronization status message from the node to another node within the synchronous transmission system if the changed synchronization status message corresponds to an active timing reference; waiting a specified amount of time upon detection of the change in the synchronization status message; then determining whether a synchronization rearrangement is necessary at the node; and then performing a synchronization rearrangement at the node if necessary.

In another embodiment of the invention, the method disclosed for reducing synchronization rearrangements within interconnected nodes of a ring transmission system, includes the steps of: updating a synchronization status message upon a change in synchronization signal quality at a first node of the ring transmission system;

transmitting the updated synchronization status message from the first node to a plurality of other nodes within the ring transmission system; propagating the updated synchronization status message from each of the plurality of other nodes to another node within the ring transmission system if the updated synchronization status message corresponds to an active timing reference; waiting a specified amount of time upon an arrival of the updated synchronization status message at each of the plurality of other nodes; determining for each of the plurality of other nodes whether a synchronization rearrangement is still necessary; and then performing a synchronization rearrangement if necessary.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein:

FIG. 19 shows a flowchart representing various decisions made at a given node in a synchronous transmission system when the present invention is used.

DETAILED DESCRIPTION OF THE PREFERRED EMBODEMENTS

Figure 2:
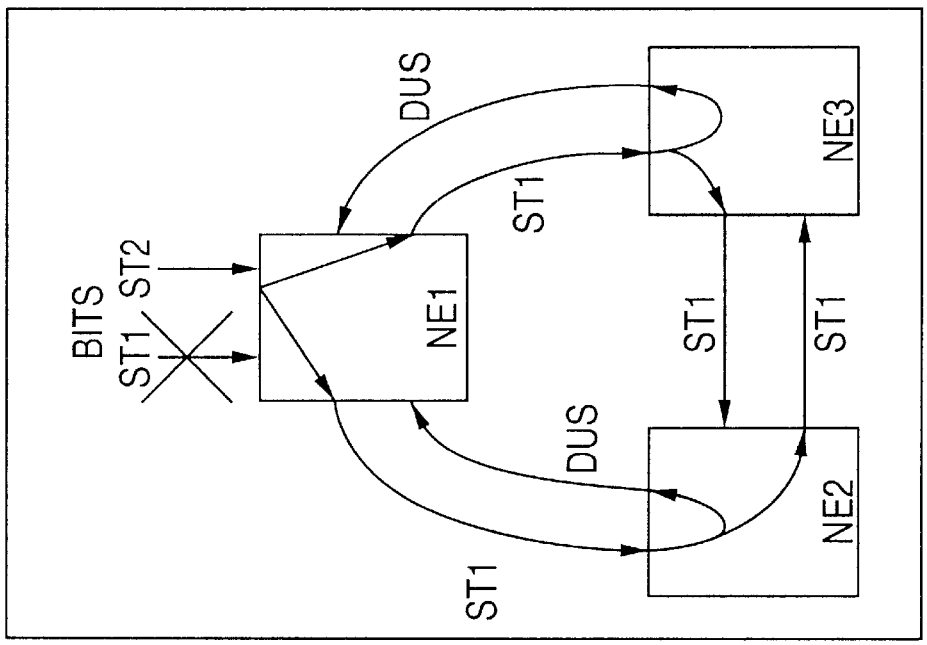
FIGS. 1–4 show the various stages of synchronization in a three-node SONET ring network without the use of the present invention.

As described herein with reference to the accompanying drawings, the present invention provides a method of substantially reducing the occurrence of unnecessary synchronization rearrangements in nodes within synchronous transmission systems such as SONET networks.

SONET (Synchronous Optical Network) has become a popular standard for optical transport of telecommunications traffic. Those skilled in the art will be familiar with the use of SONET and its inherent advantages over asynchronous transport technologies. A SONET network is a collection of nodes, or network elements, connected by one or more optical fibers. Nodes within SONET networks can be connected in numerous ways, including in both linear and ring configurations. The terms "nodes" and "network elements" are used interchangeably throughout this disclosure. In a SONET network, each network element must be clocked at the same rate (synchronous) or nearly the same rate (plesiochronous) in order to facilitate data transmission. Data is transmitted at multiples of the basic STS-1 line rate of 51.84 million bits per second (Mbps).

The clocking signal utilized at a given network element can be received from any one of a number of sources that may be available to the network element, such as: an internal clock, a signal from another network element in the network, or an externally timed clock such as a building integrated timing supply (BITS). When one node derives its clocking signal from another node in the network, it is considered to be "line timed". The various timing sources available for use within a synchronous transmission system are categorized by the level of quality of the timing signal and arranged in a hierarchy. A Stratum 1 (ST1) timing source, such as a Cesium atomic clock, is considered the most stable and accurate and its use is preferred over other timing sources. A SONET minimum clock (SMC) is the least stable timing source allowed for use in a SONET system under the present standards. A numerical indicator of the quality level (ST1, ST2, SMC, etc . . . ) of the synchronization signal utilized by a node is embedded in an overhead portion of a SONET data frame transmitted from that node to another node. This indicator is known as the synchronization status message and can be found in a 4-bit nibble within the S1 byte of the overhead of a frame. It can also be found in the extended super frame (ESF) data link of a DS1 timing source. Equipment that does not provide synchronization status messaging is supported by placing a designation STU (system traceability unknown) in the synchronization status message.

Nodes, or network elements, within SONET systems are configured generally to utilize and synchronize to the best, or highest quality timing source available to it. Thus, if a node determines that signals from both an ST1 source and a Stratum 2 (ST2) source are available for use, it will synchronize to the signal from the higher quality ST1 source. A common design of a SONET network has one or more nodes externally timed with one or more ST1 and/or ST2 source(s). The other network nodes are line timed, thus receiving their timing signals from the externally timed node, either directly or through intervening nodes, over one or more paths. In such a design, each of the line timed nodes must determine the best signal with which to synchronize from among the timing signals supplied by the externally timed nodes, using the synchronization status messages, and its own internal clock and any locally connected external clocks. When a node determines that another available timing signal is better in quality than the signal to which it is currently synchronized, the active reference signal, a synchronization rearrangement occurs.

Referring now to the drawings, it should be noted that the figures are illustrative in nature and are not drawn to scale. FIGS. 1–8 show the various stages of synchronization in a three-node SONET ring network. Those skilled in the art will understand that the number of nodes shown is for purposes of example and is not a limitation of the claimed invention. In each of the figures, the three nodes of the ring network are labelled NE1, NE2 and NE3. These nodes are interconnected to carry transport telecommunications traffic. While the arrows drawn in between the nodes may, in some cases, indicate the flow of such traffic, they are drawn, instead, to depict the flow of synchronization information between nodes. The labels placed adjacent to these arrows, such as "ST1", "ST2" and "DUS" show the contents of the synchronization status message transmitted between the applicable nodes in the direction of the arrow. In each of these figures, node NE1 is connected to two external timing sources or building integrated timing supplies (BITS). One of these timing sources has a Stratum 1 (ST1) quality level, while the other is an ST2 timing source.

Figure 1:
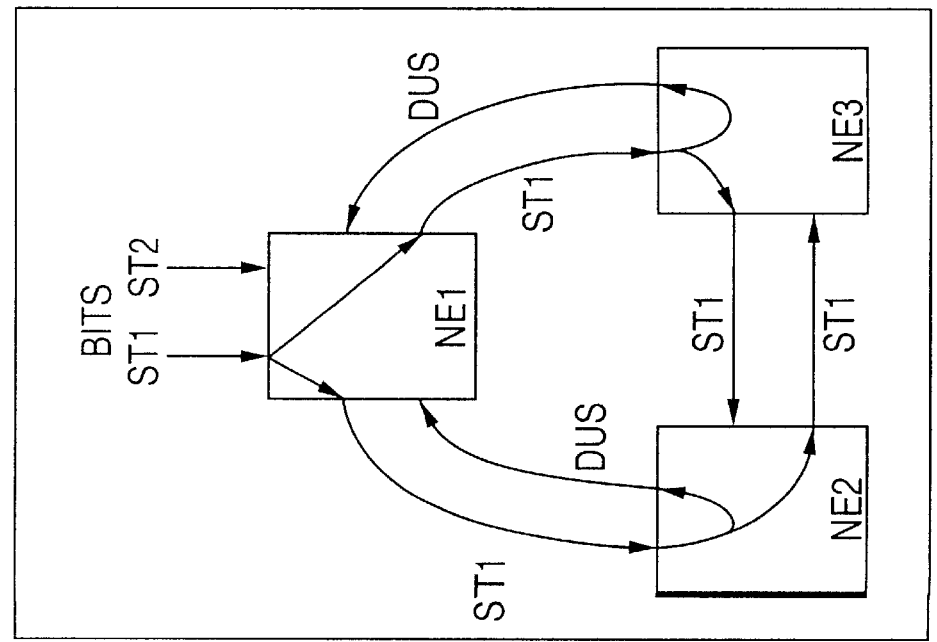

FIGS. 1–4 show the limitations of the SONET standard by showing the effects of a change in the contents of a synchronization status message and the problems caused thereby, as identified by the inventors. FIG. 1 represents an idle condition in the ring network. NE1 is externally timed and utilizes the higher quality ST1 timing source in transmitting data. The arrows within the NE1 box indicate the use of the ST1 timing source in transmitting data in both directions from NE1 around the ring network. The synchronization status message transmitted from NE1 to NE2 indicates the use of an ST1 timing source. NE2 derives its timing source from the ST1 timing signal provided by NE1. In return, NE2 transmits a "don't use for synchronization" (DUS) to NE1. DUS messages are utilized in SONET rings to prevent timing loops. If NE2 were to provide to NE1 a synchronization status message indicating the use of an ST1 timing signal, NE1 could at some point choose it as the signal to which to synchronize. This would be problematic as the embedded timing in the signal is actually from NE1 itself.

Similarly, NE1 transmits an ST1 indicator in the synchronization status message to NE3. Thus, NE3 derives its timing source from the ST1 timing signal provided by NE1. NE3 returns a DUS to NE1 to prevent a timing loop. Both NE2 and NE3 send an ST1 indicator in the synchronization status messages to each other. Thus, in the idle condition of the SONET ring shown in FIG. 1, NE1 is externally timed by an ST1 quality level timing source while NE2 and NE3 are line timed, each deriving their timing from NE1.

Turning now to FIG. 2, the cross over the ST1 timing source represents a failure thereof. Upon detection of a failure of the ST1 timing source, NE1 immediately switches to the ST2 BITS reference. The synchronization status messages transmitted in both directions from NE1 are not yet updated and thus, they still indicate use of an ST1 timing source.

Figure 3:
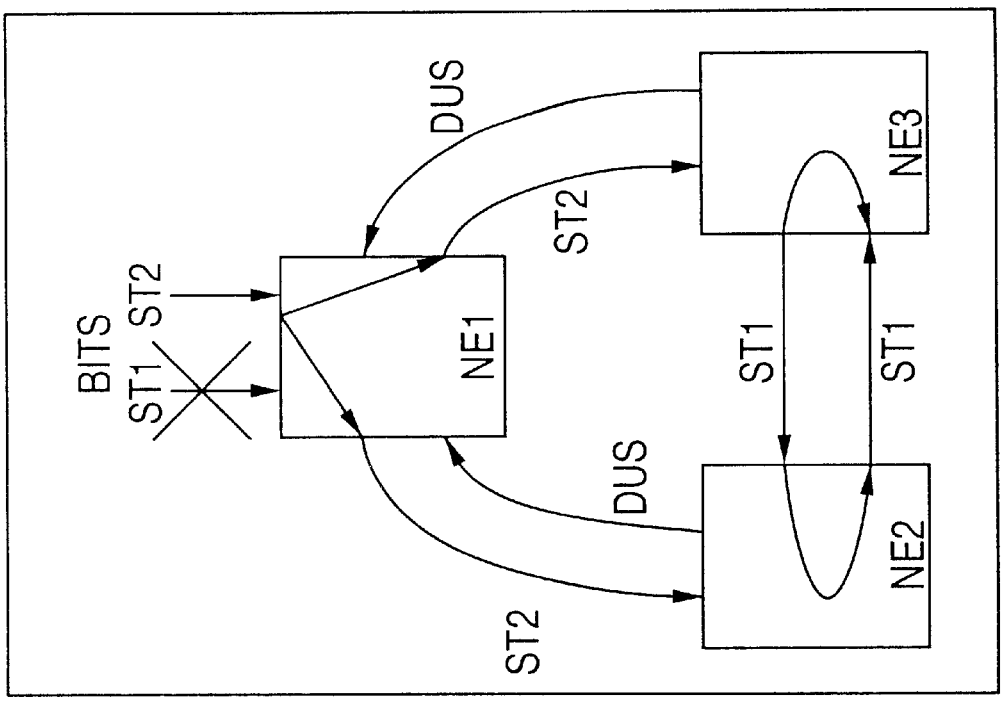

FIG. 3 shows the next chronological state of the ring network after FIG. 2. In FIG. 3, the synchronization status messages transmitted from NE1 have been updated and now indicate the use of an ST2 timing source. The synchronization status messages transmitted from NE2 and NE3 have not yet been updated and thus, NE2 and NE3 both still return a DUS to NE1. More importantly, both NE2 and NE3 still transmit an ST1 indication on their synchronization status messages to one another. Thus, both NE2 and NE3 detect the existence of an ST2 timing source from the externally timed node NE1 as well as the supposed existence of an ST1 timing source from one another.

Figure 4:
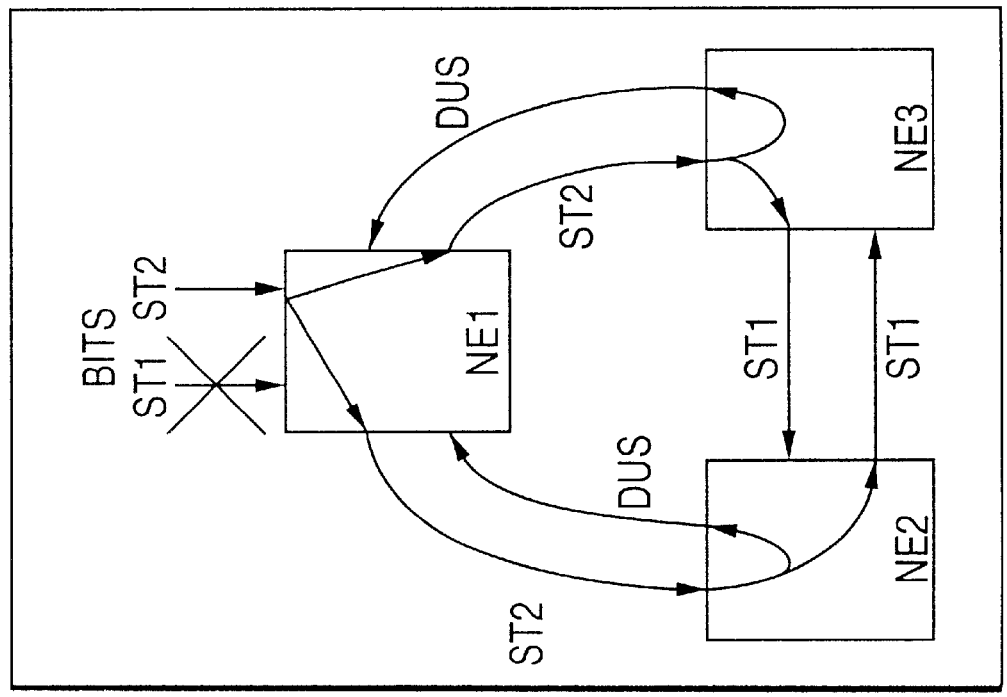

FIG. 4 shows the problems identified by the inventors with the current ring networks. In this figure, which follows chronologically from the state of the network shown in FIG. 3, both NE2 and NE3 shortly perform a synchronization rearrangement to utilize the apparent higher quality ST1 timing signal creating a timing loop. As can be seen, this apparent ST1 signal is imaginary and has no real source. The false indication of its existence, as determined by the inventors, is a result of propagation delays in communicating an updated synchronization status message to the nodes of a network. These delays can be due to differences in line length between the two paths to a node or the processing speed of intermediate nodes. Numerous and unnecessary synchronization rearrangements, or oscillations, will subsequently occur until the ring stabilizes to the ST2 timing source. These multiple rearrangements cause phase transients in the network synchronization timing which may cause a degradation in network traffic.

Before stabilization to the ST2 source, nodes NE2 and NE3 may be operating based upon their internal holdover frequencies. These holdover frequencies are of lower quality as clocking signals and are susceptible to deviation. Prolonged use of a node's holdover frequency, as often occurs in the case of multiple synchronization rearrangements, causes it to become unreliable. As a preventative measure, ring networks are designed such that they comprise multiple external timing sources or higher quality internal clocks at all nodes. This, of course, adds to the cost of building and operating such networks.

Figure 5:
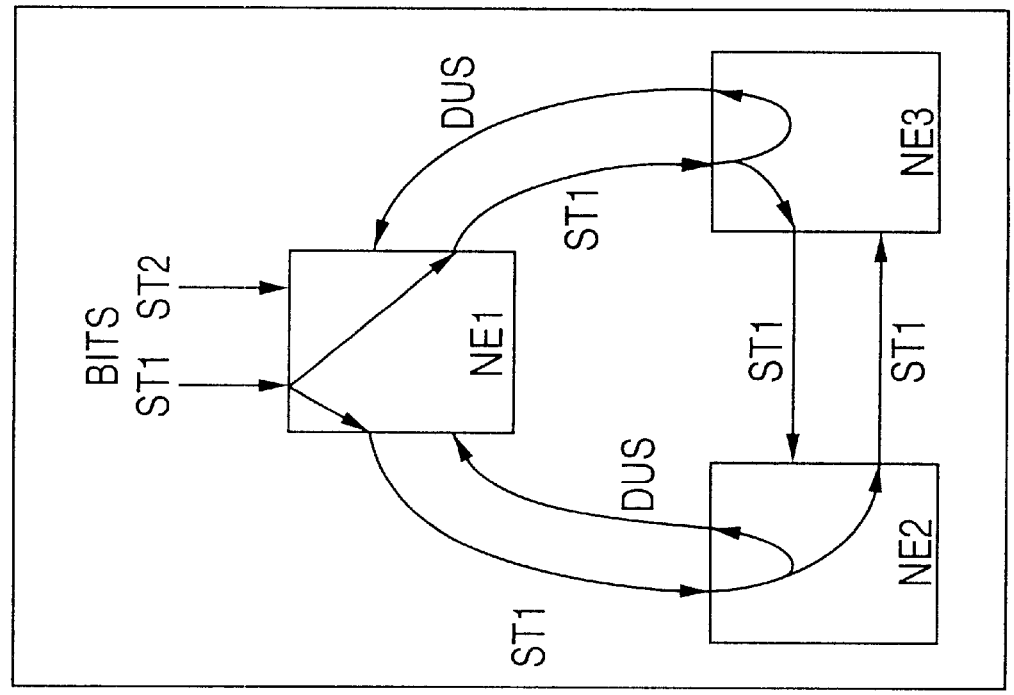

FIGS. 5–8 depict the various stages of synchronization of the three-node ring network shown in FIGS. 1–4 but wherein the method of the present invention is used. FIG. 5 shows the ring network in idle condition, equivalent to what is shown in FIG. 1. NE1 is externally timed and utilizes the higher quality ST1 timing source in transmitting data. The synchronization status message transmitted from NE1 to NE2 indicates the use of an ST1 timing source. NE2 derives its timing source from the ST1 timing signal provided by NE1. In return, NE2 transmits a DUS to NE1 to prevent a timing loop. Similarly, NE1 transmits an ST1 indicator in the synchronization status message to NE3. Thus, NE3 derives its timing source from the ST1 timing signal provided by NE1. NE3 returns a DUS to NE1 to prevent a timing loop. Both NE2 and NE3 send an ST1 indicator in the synchronization status messages to each other. Thus, in the idle condition of the SONET ring shown in FIG. 5, NE1 is externally timed by an ST1 quality level timing source while NE2 and NE3 are line timed with the ST1 from NE1 as their active reference, i.e. they are each deriving their timing from NE1.

Figure 6:
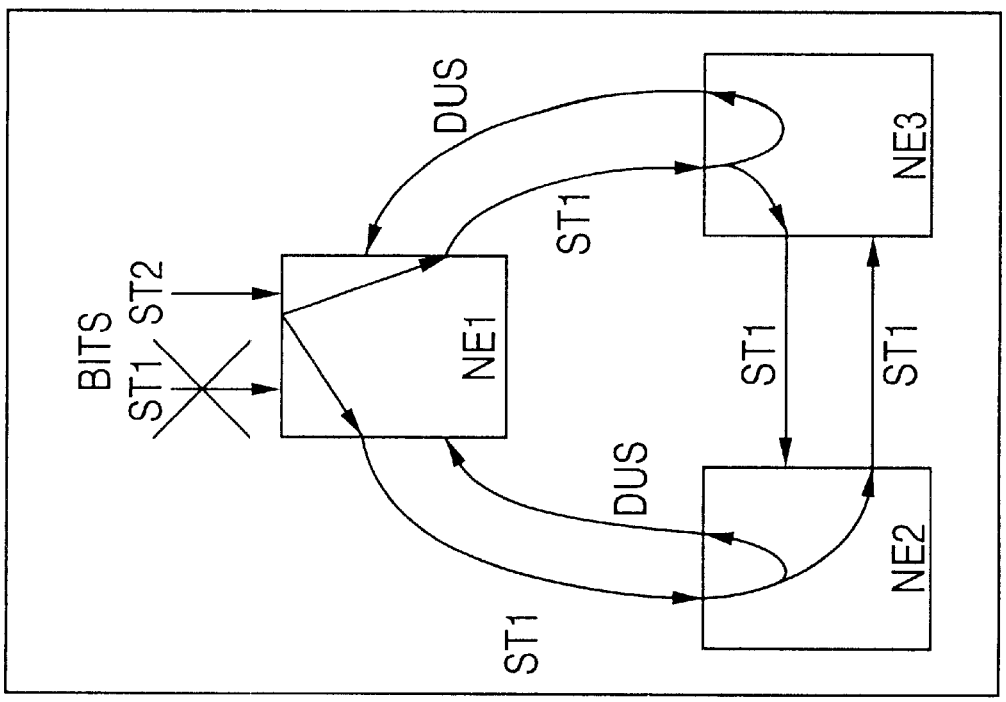
FIGS. 5–8 show the various stages of synchronization in a three-node ring SONET network using the present invention.

FIG. 6, like FIG. 2, shows the failure of the ST1 timing source and the immediate effects therefrom on the three-node ring network. Upon detection of a failure of the ST1 timing source, NE1 immediately switches to the ST2 BITS reference. The synchronization status messages transmitted in both directions from NE1 are not yet updated and thus, they still indicate use of an ST1 timing source. It is important to note that while the failure of the ST1 timing source is used for purposes of example, there are numerous other conditions that would cause a synchronization rearrangement at NE1. The application of the present invention is not limited to the case of a timing source failure.

Figure 7:
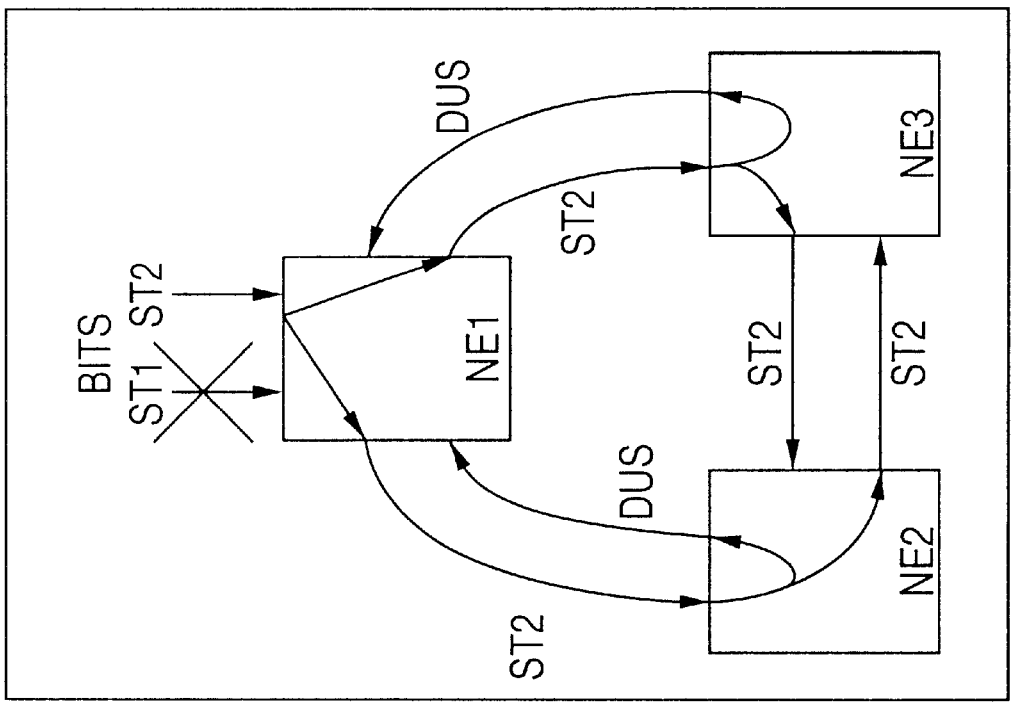

FIG. 7 shows the next chronological state of the ring network after FIG. 6. In FIG. 7, like FIG. 3, the synchronization status messages transmitted from NE1 have been updated and now indicate the use of an ST2 timing source. Both NE2 and NE3 notice the change in the synchronization status message from the active reference from an ST1 to an ST2 level. The synchronization status messages transmitted from NE2 and NE3 have not yet been updated and thus, NE2 and NE3 both still return a DUS to NE1. Notice that, like FIG. 3, both NE2 and NE3 still transmit an ST1 indication on their synchronization status messages to one another. Thus, both NE2 and NE3 detect the existence of an ST2 timing source from the externally timed node NE1 as well as the supposed existence of an ST1 timing source from one another.

Figure 8:
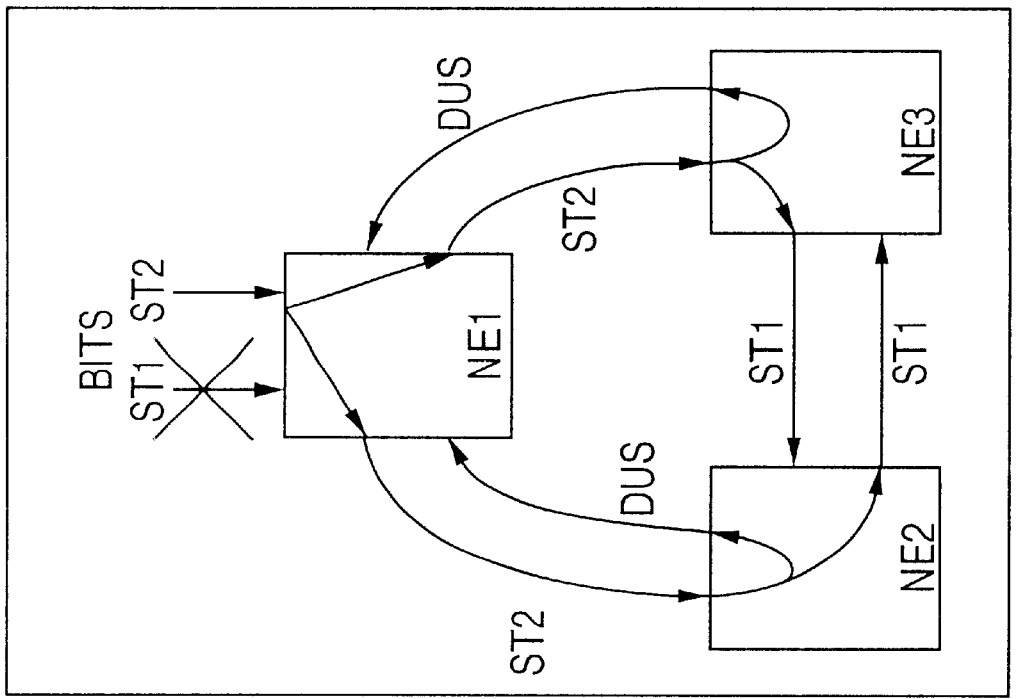

The next step, without the use of the present invention, as shown in FIG. 4, would be for NE2 and NE3 to perform synchronization rearrangements to select the highest quality reference apparently available to them. When the present invention is implemented in the ring network, as shown in FIG. 8, NE2 and NE3 do not immediately attempt to perform a synchronization rearrangement. Instead, both NE2 and NE3, having detected a change in the quality of the active reference, from ST1 to ST2, immediately propagate an updated synchronization status message. Thus, both NE2 and NE3 transmit an ST2 indication on their synchronization status messages to one another.

Also, the detection in these nodes of a change in the quality of the active reference triggers a timer which causes the nodes to delay any attempt to determine if a synchronization rearrangement is necessary. This delay is for a finite amount of time, sufficiently long such that updated synchronization status messages are received at the individual nodes from both sides of the ring network. In the case of NE2 in FIG. 8, the delay is long enough to ensure that the updated synchronization status message from NE1 and the updated synchronization status message from NE3 are both received at NE2 before NE2 determines whether a synchronization rearrangement is necessary. After the finite period of delay has elapsed, NE2 receives an ST2 indication from both synchronization status messages and thus, correctly determines that no synchronization rearrangement is necessary and, as such, none is performed. Similar events occur with respect to NE3. As can be seen in FIG. 8, unlike the condition shown in FIG. 4, no timing loop is created and no unnecessary synchronization rearrangements are performed. Accordingly, phase transients in network synchronization timing are not introduced and network traffic is not degraded. In addition, the reliance on the holdover frequencies of the individual nodes is reduced, which in turn makes feasible the operation of a ring network with fewer external timing sources.

As discussed, the length of the delay must be sufficiently long so as to ensure arrival of all updated synchronization status messages at a given node. The amount of time required depends on the number of nodes in the network through which the messages must pass to reach the given node, the speed with which the nodes propagate the messages and the propagation delay due to the length of the communication lines. Of course, the longer the delay, the greater the imposition on the flow of traffic within the network. As such, the chosen length of the delay should be as short as possible while long enough to allow all updated synchronization status messages to arrive at the given node.

While FIGS. 1–8 depict a ring configuration of a synchronous network and the use of the present invention therein, FIGS. 9–18 show the various stages of synchronization in a linear configuration of a synchronous network, both with and without the use of the present invention. Those skilled in the art will understand that the use of three nodes in these figures has been chosen for purposes of example and is not a limitation of the claimed invention. As in FIGS. 1–8, in FIGS. 9–18 the nodes of the synchronous network are labelled NE1, NE2 and NE3. These nodes are interconnected to form a synchronous linear transmission system. The arrows drawn between the nodes are intended to depict the flow of synchronization information. The labels placed adjacent to these arrows, such as "ST1", "ST2" and "DUS" show the contents of the synchronization status messages transmitted between the applicable nodes in the direction of the arrow. In these figures, nodes NE1 and NE3 are directly connected to external timing sources, or building integrated timing supplies (BITS), of Stratum 2 (ST2) quality level. These timing sources are initially also connected to a common timing source of a higher, Stratum 1 (ST1), quality level.

Figure 9:
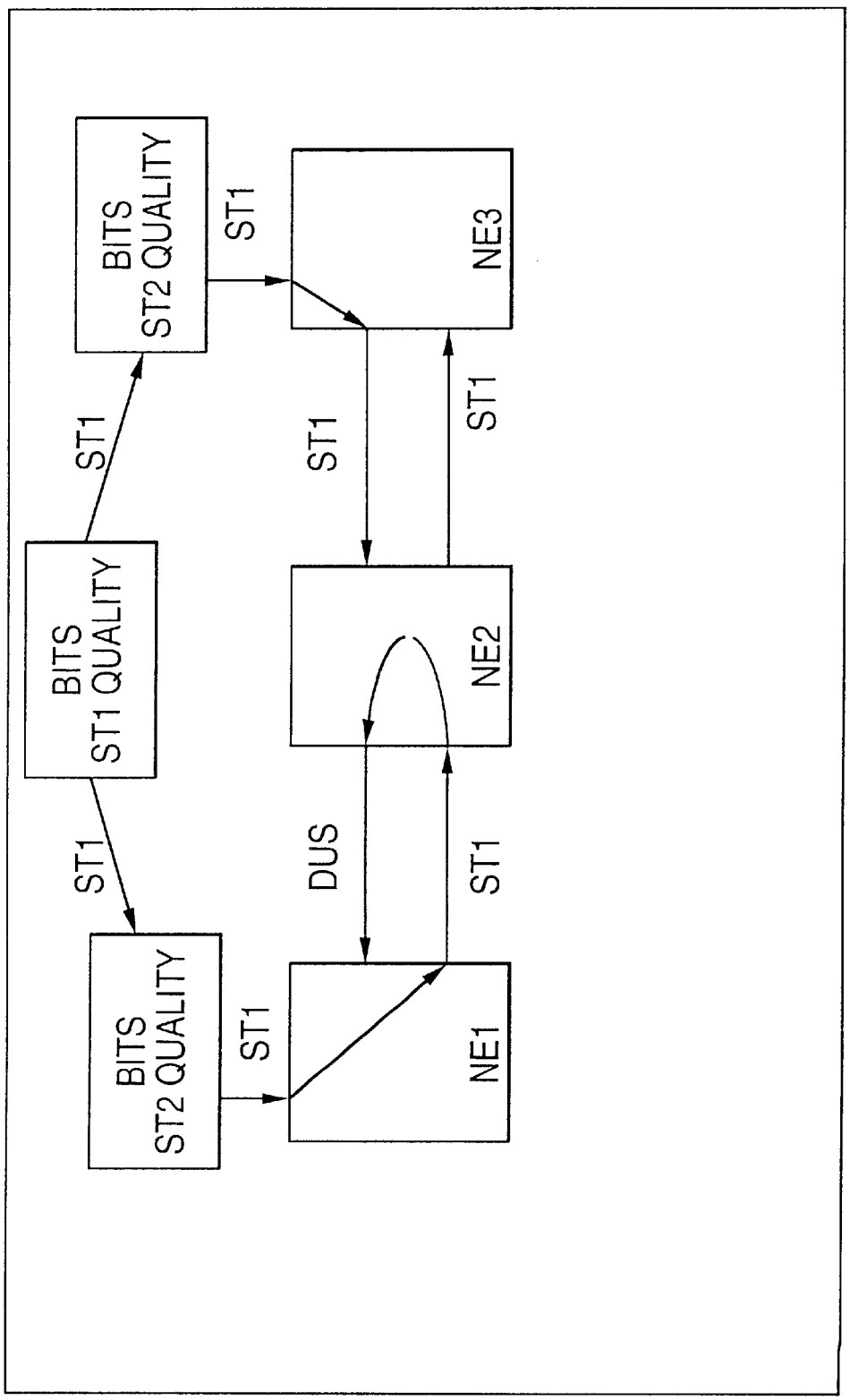
FIGS. 9–13 show the various stages of synchronization in a three node linear SONET network without the use of the present invention.

FIGS. 9–13 show the limitations of the SONET standard by showing the effects of a change in the contents of a synchronization status message and the problems caused thereby, as identified by the inventors, in a linearly configuration network. FIG. 9 represents an idle condition in the linear network. The ST1 quality BITS clock provides an ST1 quality reference signal to each of the two ST2 quality BITS clocks. The two ST2 quality BITS clocks provide the ST1 quality reference signal to the NE1 and NE3 nodes of the linear network. Thus, in the idle condition of the network, as shown in FIG. 9, nodes NE1 and NE3 each utilize an externally provided ST1 timing reference in transmitting data.

The synchronization status message transmitted from NE1 to NE2 indicates the use, by NE1, of an ST1 timing reference. NE2 derives its timing reference from the ST1 signal provided by NE1. In return, NE2 transmits a "don't use for synchronization" (DUS) indicator in the synchronization status message to NE1. As discussed with respect to FIG. 1, the DUS indicator is used to prevent timing loops. The node NE3 also transmits a synchronization status message with an ST1 indicator to NE2. Since NE2 derives its timing reference from the ST1 signal provided by NE1, it transmits a synchronization status message with an ST1 indicator to NE3. Thus, in the idle condition, nodes NE1 and NE3 are timed by external timing sources and NE2 is line timed, deriving a timing reference from NE1.

Figure 10:
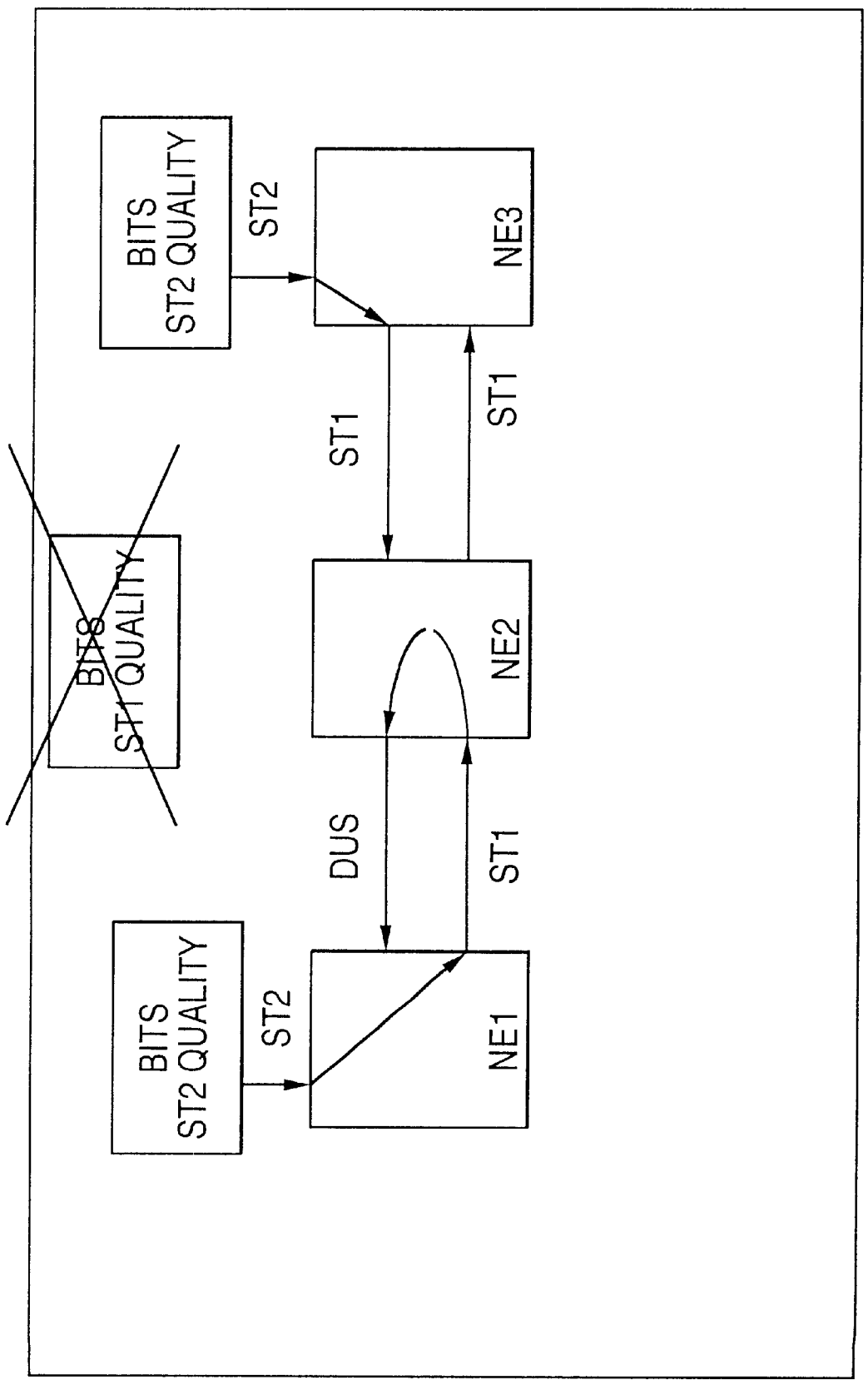

Turning now to FIG. 10, the cross over the ST1 quality BITS clock represents a failure thereof. Without an external ST1 reference, the two ST2 BITS clocks revert to their internal ST2 clocks and provide ST2 quality reference signals to nodes NE1 and NE3. As determined by the inventors, however, neither node NE1 nor node NE3 immediately detects the change in the quality level of the timing signal from the external timing sources. Accordingly, the synchronization status messages transmitted from NE1 and NE3 are not updated and continue to indicate to NE2 the use of an ST1 quality level timing source.

Figure 11:
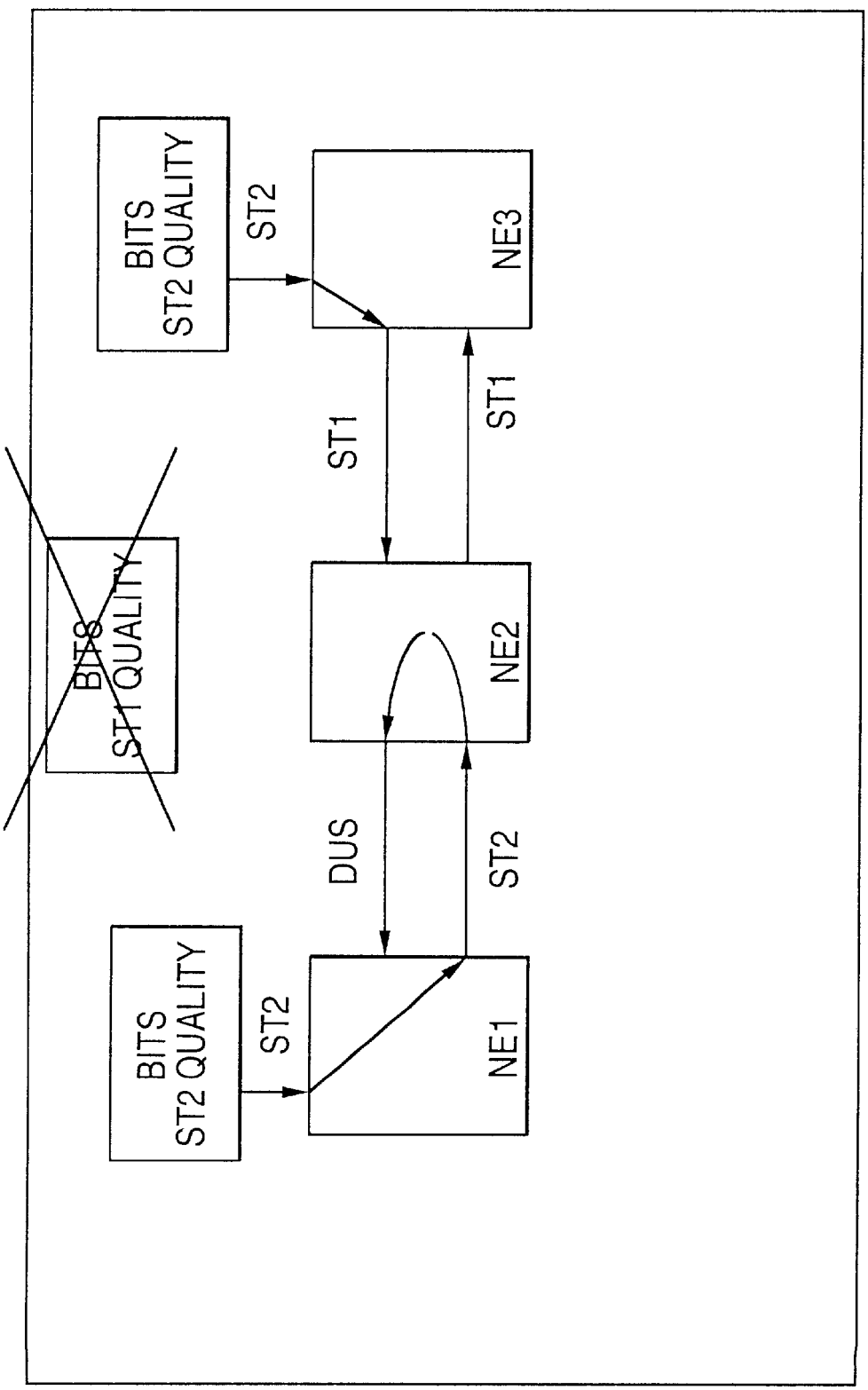

FIG. 11 shows the next chronological state of the linear network after FIG. 10. Here, NE1 has detected the change in the quality level of the timing reference provided by the external timing source from an ST1 to an ST2. NE1 has also updated the synchronization status message it transmits to NE2 to indicate the use of an ST2 timing reference. Note that NE3 continues to transmit a synchronization status message indicating the use of an ST1 timing reference as NE3 has yet to detect the change in the quality level of the timing reference provided by the external timing source to which it is connected.

Figure 12:
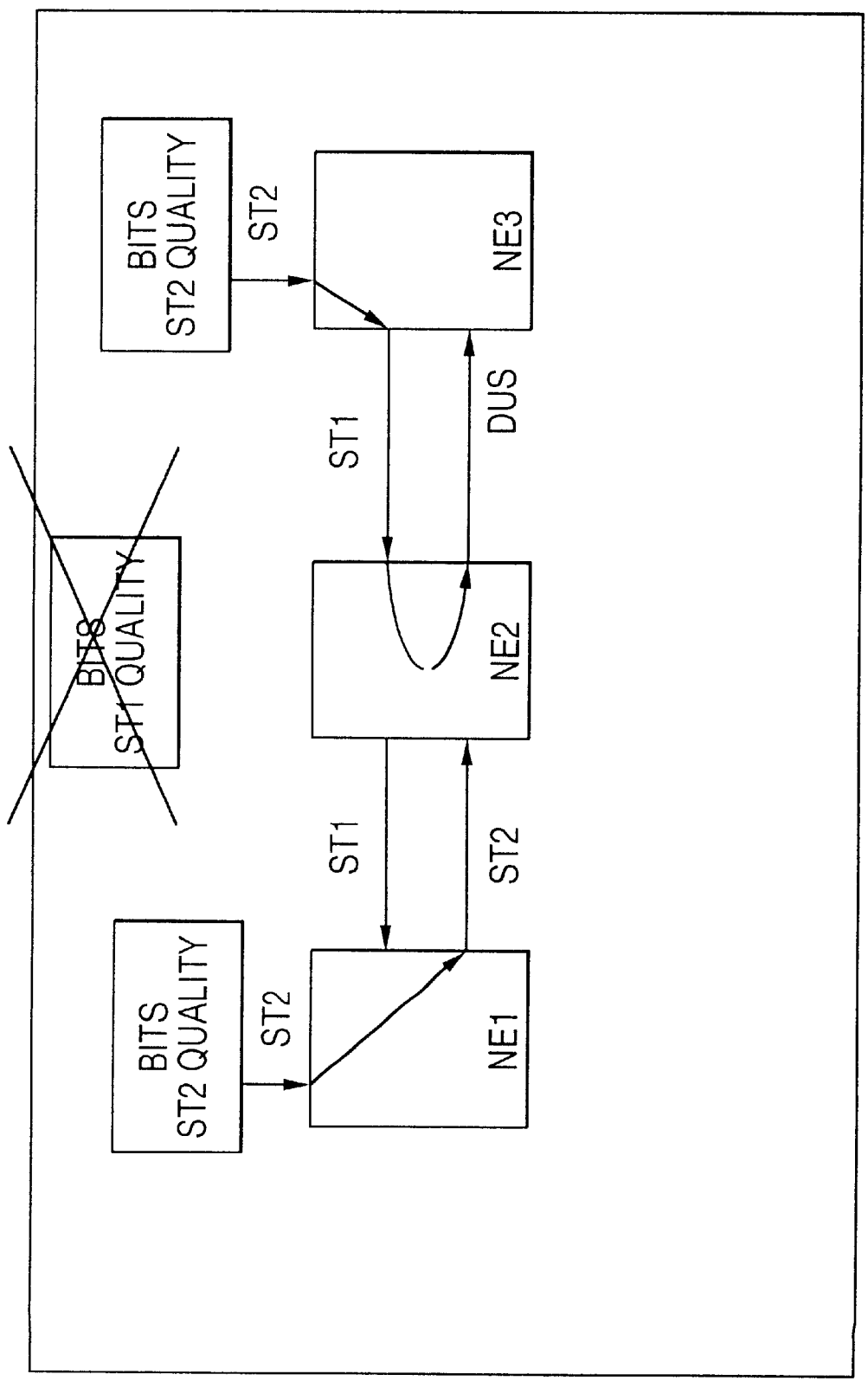

In FIG. 12, which follows chronologically from the state of the network as shown in FIG. 11, NE2 detects the change in the synchronization status message from NE1. NE2 then synchronizes to the seemingly better timing reference from NE3. Once NE2 is synchronized to the timing reference from NE3, it updates its outgoing synchronization status messages to provide a DUS indication to NE3 to prevent a timing loop and to indicate the use of an ST1 to NE1. As can be seen, this synchronization rearrangement is unnecessary since there is no real difference in the quality levels of the two timing references provided to NE2. Such unnecessary synchronization rearrangements, as discussed with respect to FIG. 1–4, cause phase transients in network synchronization timing which may cause a degradation in network traffic.

Figure 13:
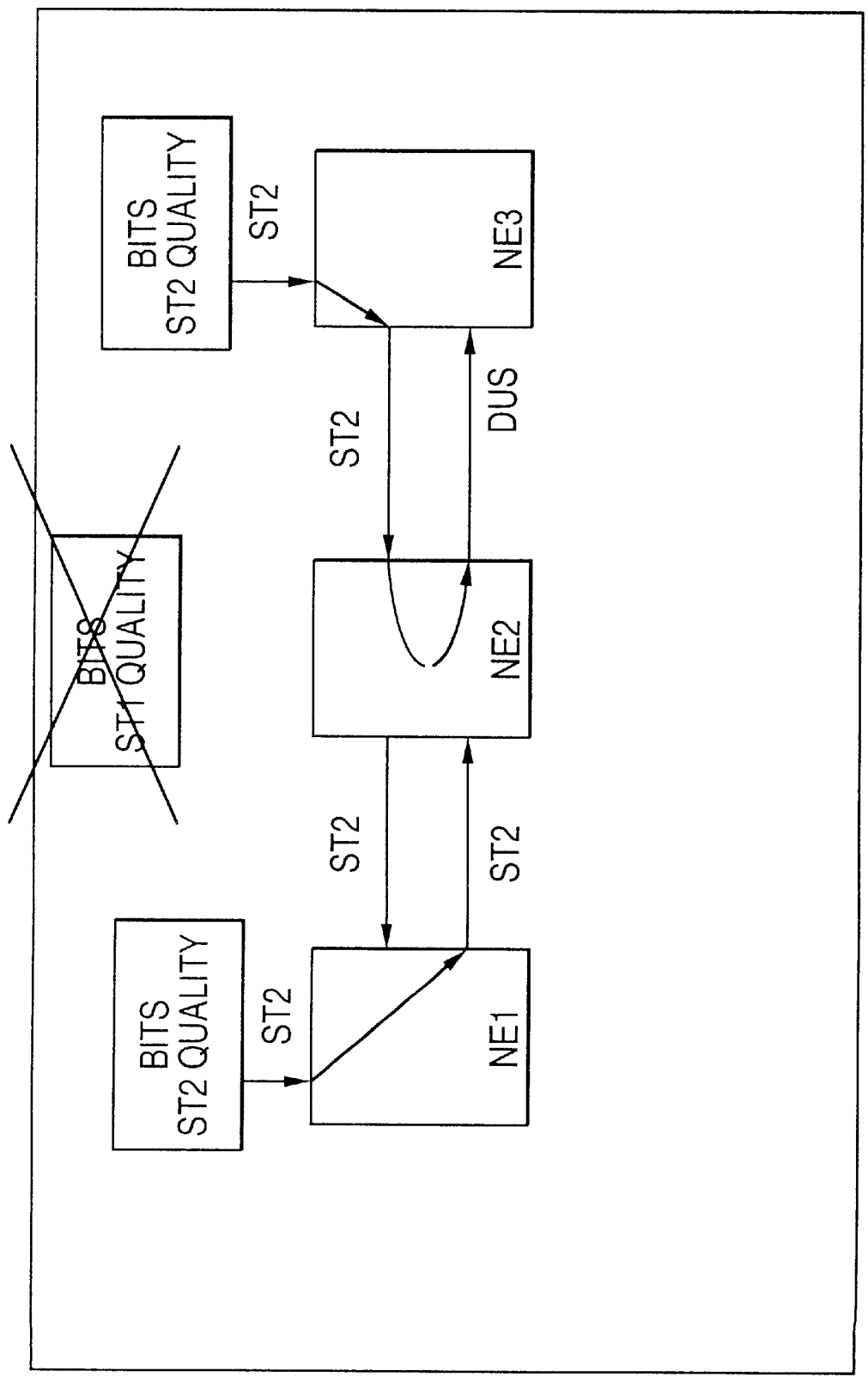

FIG. 13 shows the final chronological state of the linear network after FIG. 12. Here, NE3 has finally detected the change to ST2 in the quality level of the timing reference provided by the external timing source to which it is connected. The synchronization status message transmitted from NE3 to NE2 is updated to indicate the use of an ST2 timing reference. NE2 detects this change in the synchronization status message and updates the synchronization status message it transmits to NE1 to indicate the use of an ST2 timing reference.

Figure 14:
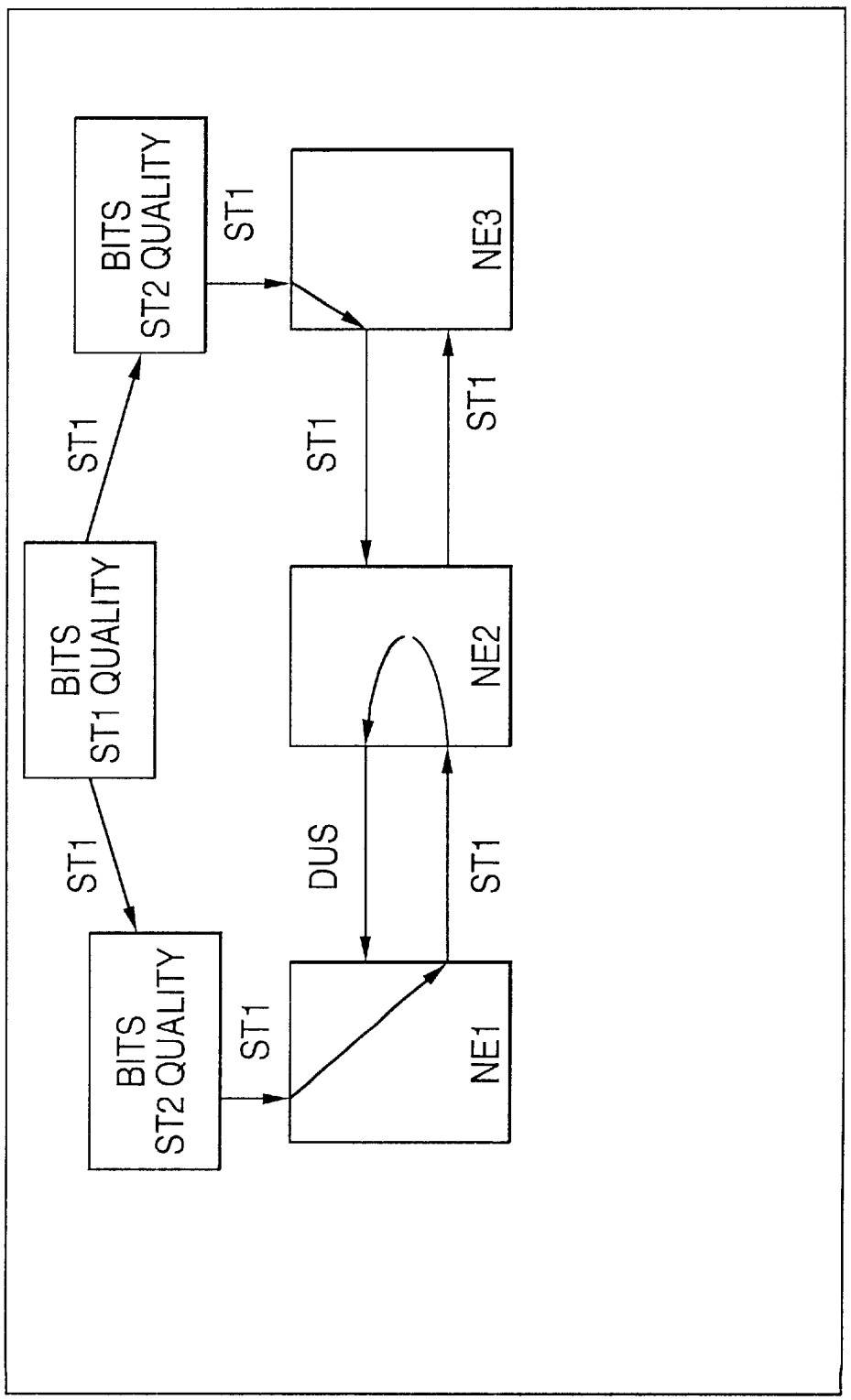
FIGS. 14–18 show the various stages of synchronization in a three node linear SONET network using the present invention.

FIGS. 14–18 depict the various stages of synchronization of the three-node linear network shown in FIGS. 9–13, but wherein the method of the present invention is used. FIG. 14 shows the linear network in idle condition, equivalent to what is shown in FIG. 9. The ST1 quality BITS clock provides an ST1 quality reference signal to each of the two ST2 quality BITS clocks. The two ST2 quality BITS clocks provide the ST1 quality reference signal to the NE1 and NE3 nodes of the linear network. The synchronization status message transmitted from NE1 to NE2 indicates the use, by NE1, of an ST1 timing reference. NE2 derives its timing reference from the ST1 signal provided by NE1. NE2 returns a DUS to NE1 to prevent a timing loop. NE3 also sends an ST1 indicator to NE2. Since NE2 is deriving its timing reference from the ST1 signal provided by NE1, it transmits an ST1 indicator to NE3. Thus, in the idle condition, nodes NE1 and NE3 are timed by external timing sources and NE2 is line timed, deriving its timing reference from NE1.

Figure 15:
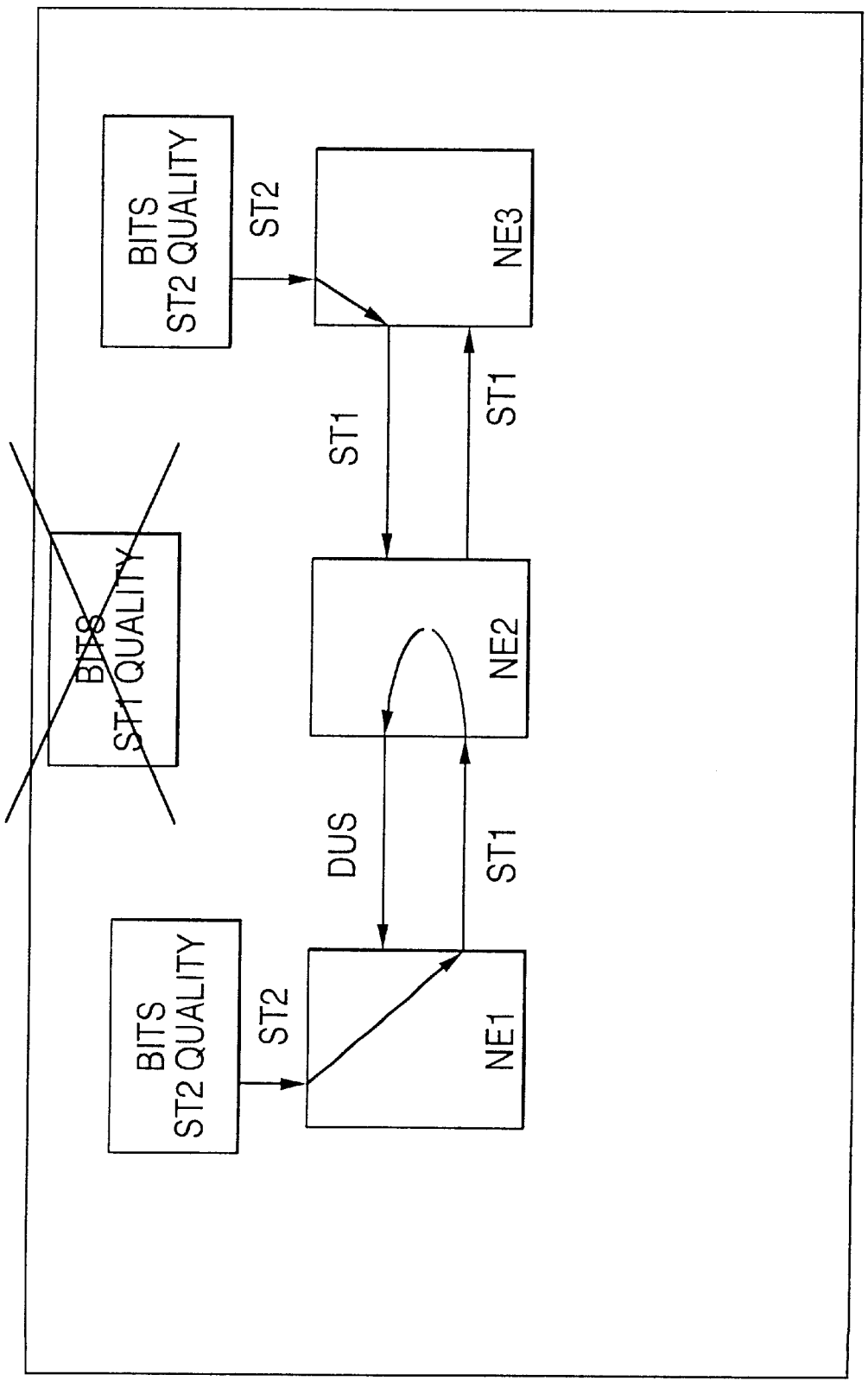

FIG. 15, as in FIG. 10, shows the failure of the ST1 quality level BITS clock and the immediate effects therefrom on the three-node linear network. The cross over the ST1 quality BITS clock represents a failure thereof. Upon detecting this failure, the two ST2 BITS clocks revert to their internal ST2 clocks and provide ST2 quality reference signals to nodes NE1 and NE3. Neither node NE1 nor node NE3 immediately detects this change in the quality level of its respective timing reference. Accordingly, the synchronization status messages transmitted from NE1 and NE3 are not updated and continue to indicate to NE2 the use of an ST1 quality level timing source.

Figure 16:
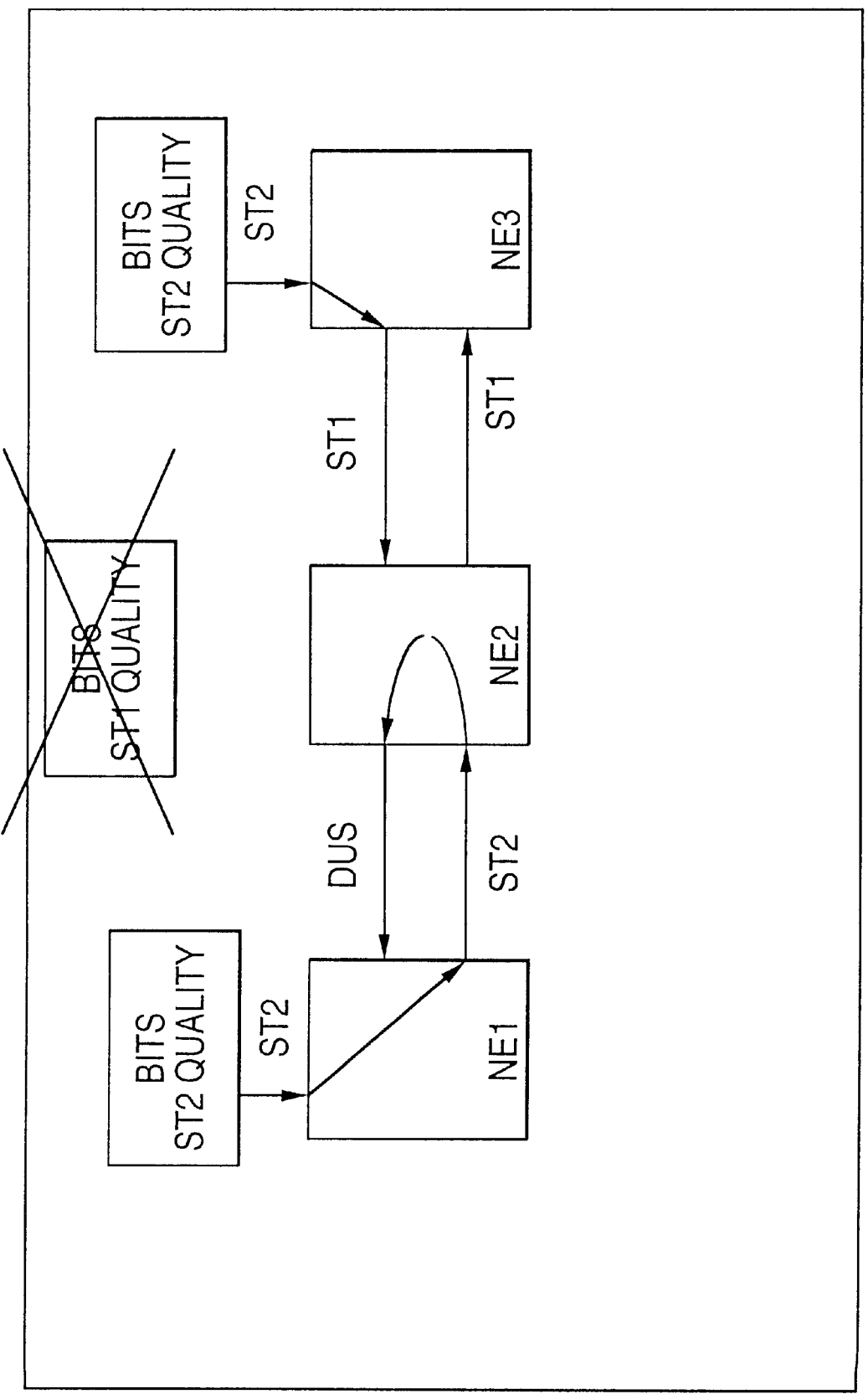

FIG. 16 shows the next chronological state of the linear network after FIG. 15. In FIG. 16, like FIG. 11, NE1 detects the change in the quality level of the timing reference provided by the BITS clock from an ST1 to an ST2. NE1 also updates the synchronization status message it transmits to NE2 to indicate the use of an ST2 timing reference. Note that NE3 continues to transmit a synchronization status message indicating the use of an ST1 timing reference as it has yet to detect the change in the quality level of the timing reference provided by the BITS clock to which NE3 is connected.

Figure 17:
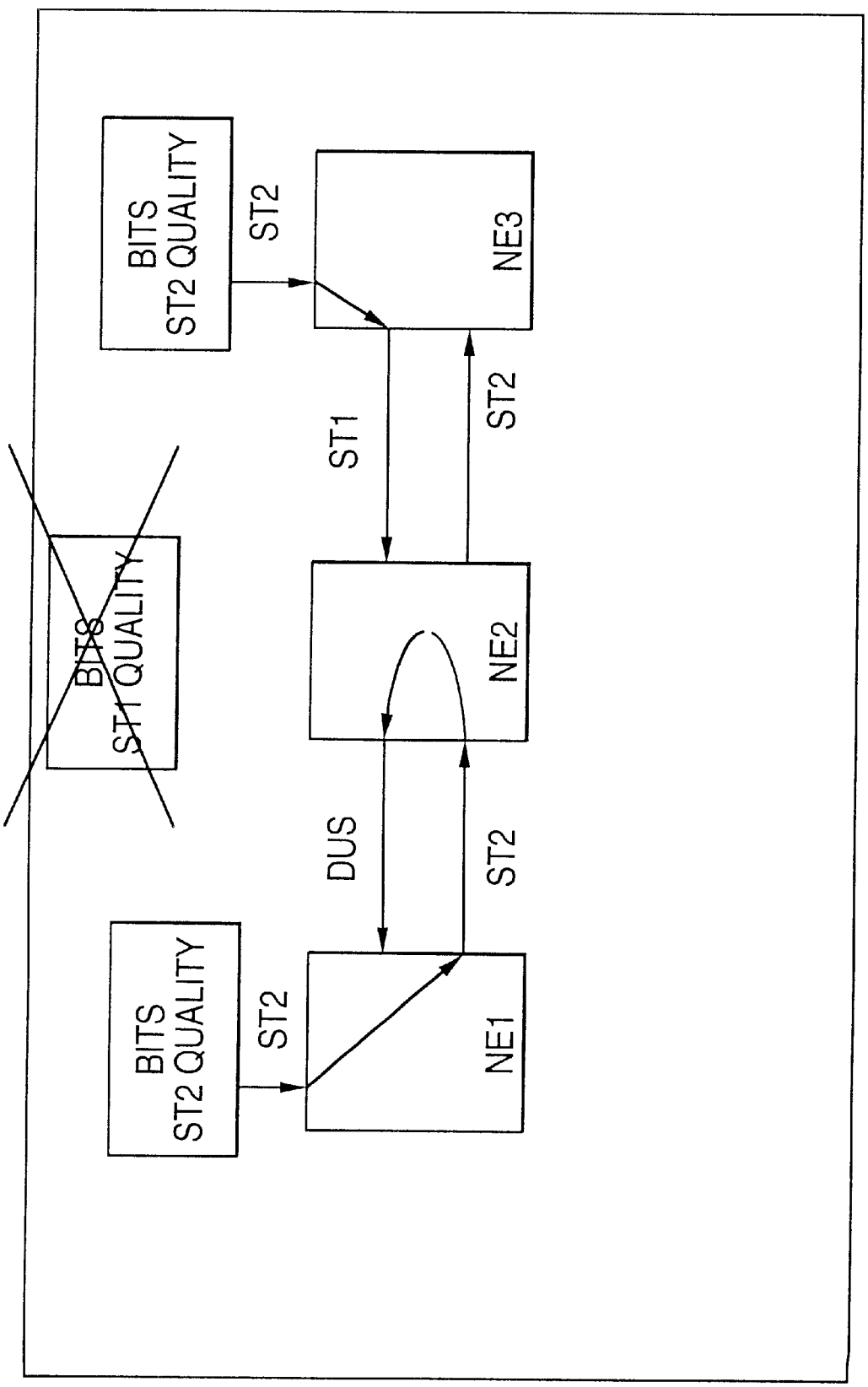

The next step, without the use of the present invention, as shown in FIG. 12, would be for NE2 to perform a synchronization rearrangement by selecting the highest quality timing reference apparently available to it. When the present invention is implemented in the linear network, as shown in FIG. 17, NE2 does not immediately attempt to perform a synchronization rearrangement. Instead, having detected a change in the quality level of the active reference, from ST1 to ST2, NE2 immediately propagates an updated synchronization status message to NE3. In addition, NE2 enters a wait mode which causes it to delay for a finite amount of time, before making an attempt to determine if a synchronization rearrangement is necessary. This delay is sufficiently long such that any other synchronization status messages arriving at NE2 are updated before a determination for synchronization rearrangement at NE2 is made.

Figure 18:
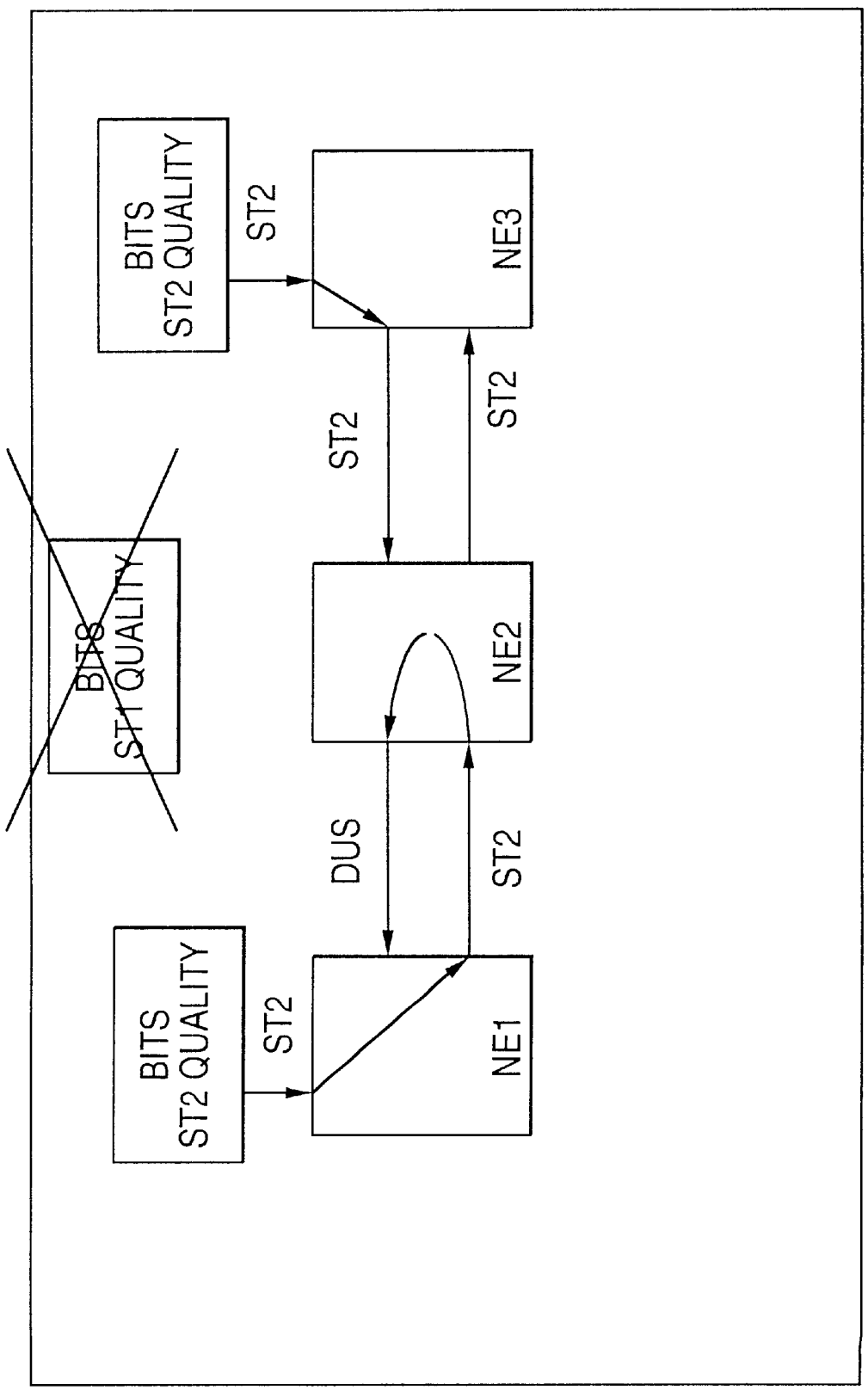

While NE2 is in a wait mode, FIG. 18 shows the next state of synchronization in the linear network wherein NE3 finally detects the change to ST2 in the quality level of the timing reference provided by the external timing source to which it is connected. The synchronization status message transmitted from NE3 to NE2 is updated to indicate the use of an ST2 timing reference. NE2 detects this change in the synchronization status message and, after the finite period of delay has elapsed, NE2 emerges from its wait mode. NE2 then makes a determination as to whether a synchronization rearrangement is necessary. NE2 correctly determines that no available timing reference is of higher quality than its active reference, from NE1, and therefore, it does not attempt to perform a synchronization rearrangement. As can be seen in FIGS. 17 and 18, no unnecessary synchronization rearrangements are performed. Therefore, no phase transients are introduced in network synchronization timing and linear network traffic is not degraded. In addition, the reliance on the holdover frequencies of individual nodes, as discussed with respect to the ring network, is reduced, which in turn makes feasible the operation of a linear network with fewer external timing sources.

The method of the present invention is herein described in greater detail with reference to the flowchart shown in FIG. 19. This flowchart is representative of the decisions made at a given node in a synchronous network, such as NE2 or NE3 in FIGS. 5–8 or NE2 in FIGS. 14–18.

The flowchart begins with the idle condition of a node, in terms of its synchronization. Box 100 indicates that the node has detected a change in the contents of the synchronization status message, such as from an "ST1" to an "ST2", from any reference. Next, in step 102, the node determines whether the new synchronization status message indicates "don't use for synchronization" (DUS). If the synchronization status message indicates a DUS, then the node will proceed to step 140 and immediately determine whether a synchronization rearrangement is necessary and will update its outgoing synchronization status message in step 150 to indicate the quality of the synchronization signal utilized.

If, in step 102, the node determines that the new synchronization status message does not indicate a DUS, then it determines in step 104 whether the new synchronization status message indicates a lower signal quality level than the level of the internal clock of the node itself. If so, then the node will proceed to step 140 and immediately determine whether a synchronization rearrangement is necessary and will update its outgoing synchronization status message in step 150 to indicate the quality of the synchronization signal utilized.

If, in step 104, the new synchronization status message does not indicate a lower signal quality level than the level of the internal clock of the node, then the node will proceed to step 106 and determine if the change in the contents of the synchronization status message was from the active reference. If it was, then the node will proceed to step 108 and immediately update its outgoing synchronization status message to indicate the new quality level of the active reference and then proceed to step 110. Note that, at this point, the node has not actually performed a synchronization rearrangement, it has simply propagated the change in the quality level indicator of the active timing reference. If the node determines in step 106 that the change in the synchronization status message did not involve the active reference, then the node proceeds directly to step 110.

Step 110 indicates the start of the finite period of delay. As discussed, this delay period allows for updated synchronization status messages to arrive at the node before the node determines whether a synchronization rearrangement is necessary. Step 112 indicates the end of the delay period at which time the node proceeds to step 114 where it then makes a more informative determination as to whether a synchronization rearrangement is necessary. The node then updates its outgoing synchronization status message in step 116 to indicate the quality of the synchronization signal utilized by the node.

The discussion above was directed to the case where while in an idle condition, the node was able to detect a change in the contents of a synchronization status message.

There are cases, however, where the node may fail to detect any synchronization status message from an active reference, much less a change in its contents. This would be indicative of a failure of the timing source itself (box 120) or of an equipment failure affecting the active timing reference (box 130). In either of these cases, the node will proceed immediately to step 140 and determine whether a synchronization rearrangement is necessary based upon its list of available timing references. The node will then update its outgoing synchronization status message, in step 150. There will be no forced delay in such cases. One example of this was discussed in reference to FIGS. 2 and 6 where NE1 immediately switched to an alternate source when the ST1 timing source failed. Another example of when the node would not be subject to a forced delay is where there is an equipment failure affecting the timing reference signal, such as an equipment failure at a node or a break in the fiber loop. In all of these cases, the node will lose its active reference signal and immediately attempt to perform a synchronization rearrangement to an alternate source.

It is intended that the invention, as described herein, include all variations and modifications as fall within the scope of the claims and equivalents thereof.

What is claimed is:

1. A method of reducing synchronization rearrangements within interconnected nodes of a synchronous transmission system, said method comprising the steps of:

detecting, at a node within the synchronous transmission system, a change in a synchronization status message received at the node;

propagating said changed synchronization status message from the node to another node within the synchronous transmission system if the changed synchronization status message corresponds to an active timing reference; and waiting, at the node, a specified amount of time upon detection of the change in the synchronization status message.

2. A method according to claim 1 further comprising the step of:

determining whether a synchronization rearrangement is necessary at the node after performing the step of waiting a specified amount of time.

3. A method according to claim 2 further comprising the step of:

performing a synchronization rearrangement at the node based upon said determination.

4. A method according to claim 1 wherein the synchronization status message received at the node is extracted from a data frame.

5. A method according to claim 1 wherein the synchronization status messages is received at the node via a connection to one of an external timing source and another node within the synchronous transmission system.

6. A method of reducing synchronization rearrangements within interconnected nodes of a ring transmission system, said method comprising the steps of:

updating a synchronization status message upon a change in synchronization signal quality at a first node of the ring transmission system;

transmitting the updated synchronization status message from the first node to a plurality of other nodes within the ring transmission system;

propagating the updated synchronization status message from each of said plurality of other nodes to another node of said plurality of other nodes within the ring transmission system if said updated synchronization status message corresponds to an active timing reference; and waiting a specified amount of time upon an arrival of the updated synchronization status message at each of said plurality of other nodes.

7. A method according to claim 6 further comprising the step of:

determining for each of said plurality of other nodes whether a synchronization rearrangement is necessary after performing the step of waiting a specified amount of time.

8. A method according to claim 6 further comprising the step of:

performing a synchronization rearrangement based upon the result of said determining step, for each of said plurality of other nodes.

9. A method according to claim 6 wherein said first node is externally timed.

10. A method according to claim 6 wherein at least one of said plurality of other nodes is line timed.

11. A method according to claim 6 wherein the ring transmission system is a synchronous optical network (SONET).

12. A method according to claim 6 wherein the synchronization message is embedded in a data frame.

13. A method of reducing synchronization rearrangements at a node within a ring transmission system, said method comprising the steps of:

receiving at said node a synchronization status message in a data frame from a first node within the ring transmission system wherein the synchronization status message can indicate a synchronization signal quality at the first node;

determining from the synchronization status message whether the synchronization signal quality at the first node has changed;

propagating the synchronization status message to a second node within the ring transmission system if the synchronization status message corresponds to an active timing reference; and waiting a specified amount of time when it is determined that the synchronization signal quality at the first node has changed.

14. A method according to claim 13 further comprising the step of:

determining whether a synchronization rearrangement at said node is necessary after performing the step of waiting a specified amount of time.

15. A method according to claim 13 wherein said first node is externally timed.

16. A method according to claim 13 wherein said node is line timed.

17. A method according to claim 13 wherein the ring transmission system is a synchronous optical network (SONET).

* * * * *